United States Patent [19]

Kathol et al.

[11] Patent Number: 4,839,658

[45] Date of Patent: Jun. 13, 1989

[54] PROCESS FOR EN ROUTE AIRCRAFT CONFLICT ALERT DETERMINATION AND PREDICTION

[75] Inventors: Shawn Kathol, Diamond Bar; Patrick R. Williams, Costa Mesa, both of Calif.

[73] Assignee: Hughes Aircraft Company, Los Angeles, Calif.

[21] Appl. No.: 891,435

[22] Filed: Jul. 28, 1986

[51] Int. Cl.⁴ .................... G01S 3/02

[52] U.S. Cl. .................... 342/455; 342/29; 342/30; 364/461

[58] Field of Search .................... 342/455, 29, 30; 364/461

[56] References Cited

U.S. PATENT DOCUMENTS

| | | | |
|---|---|---|---|
| 3,808,598 | 4/1974 | Carter | 364/461 |
| 4,359,733 | 11/1982 | O'Neill | 343/6.5 LC |
| 4,623,966 | 11/1986 | O'Sullivan | 364/461 |

OTHER PUBLICATIONS

Hughes Proprietary Engineering Notebook Entries 5.3.12, 7/85.

Hughes Proprietary Engineering Notebook Entries 5.2.12.2, 9/85.

Computer Program Functional Specifications for En Route Conflict Alert, Oct. 1975, The MITRE Corporation-MITRE Tech. Report MTR-7061.

*Primary Examiner*—Theodore M. Blum
*Assistant Examiner*—David Cain
*Attorney, Agent, or Firm*—A. W. Karambelas

[57] ABSTRACT

A process is provided for establishing when selected pairs of airborne aircraft are in en route conflict or are in potential en route conflict. The process includes a number of "filtering" steps arranged in three branches. At each step, different conditions, such as height separation, lateral separation, height convergence, lateral convergence and "look-ahead" projections are examined for each aircraft pair. Criteria are established for each "filtering" step such that aircraft pairs not passing the filter to the next step are exited as either "no conflict", "current conflict" as "potential conflict". Sixteen such filtering steps are provided, one of which establishes a "current conflict" status and four of which establish a "potential conflict" status.

24 Claims, 10 Drawing Sheets

Fig. 5f.

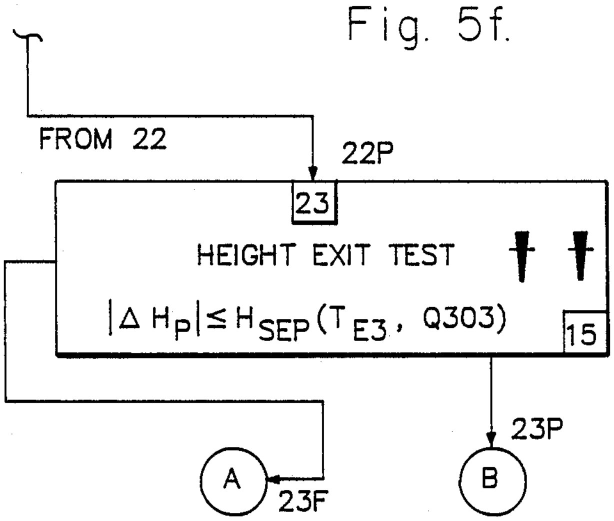

†

LATERAL SEPARATION FUNCTION

COMPUTES SEPARATION AT TIME T WITH MULTIPLIER M $$L_{SEP}(T,M) = Q218 + M(P_{P1} + P_{P2})^{1/2}$$

WHERE: $j = 1, 2$ $$TV_j = T - T_{LUPDj} + T_{REF}$$

$$a = P_j + (2)(TV_j)(C_j) + (TV_j)^2 (V_j)$$

$$P_{pj} = MIN\ (a,\ Q225)$$

† †

HEIGHT SEPARATION FUNCTION

COMPUTES SEPARATION AT TIME T WITH MULTIPLIER M $$H_{SEP}(T,M) = H_{SEP1} + M(HP_{P1} + HP_{P2})^{1/2}$$

WHERE: $j = 1, 2$ $$THV_j = T - T_{LHUPDj} + T_{REF}$$

$$b = HP_j + 2\,(THV_j)(HC_j) + (THV_j)^2 (HV_j)$$

$$HP_{pj} = MIN\ (b,\ Q226)$$

PROCESS FOR EN ROUTE AIRCRAFT CONFLICT ALERT DETERMINATION AND PREDICTION

BACKGROUND OF THE INVENTION

1. Field of the Invention

The present invention relates generally to the field of aircraft collision avoidance procedures and, more particularly, to procedures for establishing aircraft en route conflict alerts.

2. Description of Related Art

Each airborne aircraft has surrounding it an imaginary safety or nonintrusion zone. These safety zones are such that when one aircraft intrudes into the safety zone of another aircraft, a mid-air collision may be possible. Within the United States, the Federal Aviation Administration (FAA) establishes the extent of aircraft safety zones and currently provides for disc-shaped safety zones which, under specified conditions, are 10 miles in diameter and 2,000 feet in height. Similar aircraft safety zones are, in general, established in other countries of the world by national FAA counterparts.

Air route traffic control centers (ARTCC's) are, as is well known, maintained throughout the world. It is a principal responsibility of air traffic controllers operating these ARTCC's to monitor and direct en route air traffic in such a manner that air safety is assured. As part of their responsibility for assuring air safety, air traffic controllers continually attempt to maintain sufficient separation among aircraft under their control that no aircraft's safety zone is violated by another aircraft.

Typically, aircraft positional data required by air traffic controllers is provided by ground-based radar associated with the ARTCC's and the aircraft-carried transponders. Such transponders provide aircraft identification and aircraft altitude data determined by onboard altitude measuring equipment. Data output from the radars and transponders is processed by computer portions of the ARTCC's and aircraft status is displayed on a CRT screen for use by the air traffic controllers.

The air traffic control computers are also typically programmed to provide information as to actual and impending aircraft safety zone intrusion. In response to the detection of actual or near-future (usually 1-2 minutes) safety zone intrusions the computers cause aircraft en route conflict alerts to be displayed on the air traffic controllers' monitoring screens. Such conflict alert displays typically also provide identification of the aircraft involved and the controlling sector or sectors. In response to the conflict alerts, the responsible air traffic controller or controllers give appropriate altitude and heading directions to the involved aircraft to eliminate or prevent the intrusion and cancel the conflict alert. Current FAA practices relating to en route aircraft conflict alerts are, for example, detailed in a technical report entitled "Computer Program Functional Specifications for En Route Conflict Alert," Report No. MTR-7061, dated October, 1975 and published by The Mitre Corporation.

The accurate determination or prediction of conflict alerts, of course, requires a precise knowledge of position and altitude of all aircraft within the traffic control system sector. Moreover, to accurately predict near-future conflicts, precise information as to aircraft velocity vectors are also required. Ground-based radar is not, however, usually capable of determining aircraft altitude with sufficient precision to provide accurate conflict alert determinations and predictions. Reliance as to precise altitude is, as a result, placed upon information relayed from the aircraft via their transponders. The accuracy of the aircraft generated altitude information is, in turn, dependent upon such factors as the continual updating, within the responsible ARTCC, of local barometric pressures along the aircraft's flight path.

As a result of imprecise determinations of aircraft position, and especially of aircraft altitude, present procedures for determining and predicting en route conflict alerts tend to cause excessive false alarm alerts. In addition, many actual or impending conflicts may not be detected and hence cannot be displayed as conflict alerts. Of significant concern to the FAA and other international air traffic control organizations is the effect false alerts have on air traffic controller productivity and, as well, the effect they have upon air safety. If the processes used frequently fail to detect conflict alerts with sufficient warning time so that the controllers and pilots can maneouver the aircraft and avoid actual conflicts, then the processes are only marginally effective and their usefulness as aids to the controller is questionable. Conversely, since each and every conflict alert demands the attention of the responsible controller to examine the situation and determine the action appropriate for the situation, if a significant number of conflict alerts are generated which turn out to be false alarms (that is, no action is taken by the controllers or pilots and an actual alert never occurs), the believability of the process is reduced. Moreover, the time required on the part of the controllers to react to each alert may actually reduce the controller's effectiveness in maintaining safe air traffic flow.

The solution to the problem of frequent false alarm conflict alerts and occassional missed detections is not to ignore conflict alerts but, instead, to improve the accuracy of determining conflict alerts so that they can by fully relied upon by the air traffic controllers.

SUMMARY OF THE INVENTION

A process, according to the present invention, is provided for determining en route airspace conflict alert status for a plurality of airborne aircraft for each of which the position, altitude and velocity are monitored in a substantially continuous manner and for which a preestablished height separation standard and lateral separation standard exists. The process comprises pairing each of the aircraft with at least one other of the aircraft to form at least one aircraft pair to be considered for conflict alert status and determining for each aircraft pair whether the two aircraft involved meet the conditions of: (i) having a height separation equal to, or less than, a preselected gross height separation distance (Condition 1), (ii) converging in height or diverging in height at a rate equal to, or less than, a preselected small height diverging rate (Condition 2), (iii) converging laterally or diverging laterally at a rate equal to, or less than, a preselected small lateral diverging rate (Condition 3), (iv) having a height separation equal to, or less than, the height separation standard (Condition 4) and (v) having a lateral separation equal to, or less than, the lateral separation standard (Condition 5); and for establishing each aircraft pair satisfying all of Conditions 1 through 5 as being in current conflict.

The process preferably includes the insequence determining of whether each said aircraft pair meets Conditions 1 through 5, and for eliminating from further present consideration any aircraft pairs which do not meet any one of Conditions 1 through 3. Also the process preferably includes considering for potential conflict alert status all pairs of aircraft which have been found to meet Conditions 1 through 3 but which do not meet both Conditions 4 and 5, and futher determining for each of those aircraft pair considered for potential conflict alert status whether both of the aircraft are not in a suspended status (Condition 6) and for eliminating from further present consideration any aircraft pair not meeting Condition 6 because both involved aircraft are in a suspended status.

Further, there may be included in the process the step of determining for each aircraft pair considered for potential conflict alert status and which: (i) does not meet either of Conditions 4 and 5 (is not in current height or lateral intrusion); or (ii) meets Condition 5 but not Condition 4 (is in current lateral, but not height, intrusion), whether the two aircraft are converging in height at a rate equal to, or greater than, a preselected height converging rate (Condition 7) and for eliminating from further present configuration all aircraft pairs not meeting Condition 7.

According to a preferred embodiment, the process also includes the step of determining for each aircraft pair considered for potential conflict alert status and which: (i) meets Condition 4 but not Condition 5 (is in current height, but not lateral, intrusion); or (ii) does not meet either of Conditions 4 and 5 (is in neither height nor lateral intrusion) but meets Condition 7 (height converging rate), whether the two aircraft are laterally converging at a rate equal to, or greater than, a preselected lateral converging rate (Condition 8) and for eliminating from further present consideration all aircraft pairs not meeting Condition 8. In such a case the process further includes the step of determining for each aircraft pair that meets Condition 8 (lateral converging rate) whether the two aircraft are predicted to be laterally separated by a distance less than a preselected minimum lateral separation distance (Condition 10) and for eliminating from further present consideration all aircraft pairs not meeting Condition 10. In such case there is included the step of determining for each aircraft pair that meets Condition 10 (minimum lateral separation) whether the lateral separation distance between the two aircraft will penetrate a preselected separation volume computed using a maximum preselected look-ahead time (Condition 11) and for eliminating from further present consideration all aircraft pairs not meeting Condition 11.

Still further, the process may include the step of determining for each aircraft pair that meets Condition 11 (future separation volumes penetration) whether, for the two aircraft, the computed time to violate a preselected lateral maximum separation standard is less than the preselected look-ahead time (Condition 12) and for eliminating from further present consideration all aircraft pairs which do not meet Condition 12.

Advantageously, the process further includes the step of determining for each aircraft pair that meets Condition 12 (time to violate maximum lateral separation standard), and which also met Condition 4 but not Condition 5 (is in current height but not lateral intrusion), whether the two aircraft are converging in height at a rate equal to or greater than a preselected height converging rate (Condition 13) and for defining all aircraft pairs not meeting Condition 13 (which determines height parallel flight) as having a potential conflict alert status. In such case, the process may also include the step of determining for each pair of aircraft which: (i) meets Conditions 13 (is height parallel); or (ii) meets Condition 12 (time to maximum lateral separation standard) and which also did not meet either Condition 4 and 5 (are not in current height or lateral intrusion), whether the two aircraft are diverging in height at a rate equal to, or less than, a preselected height divergence rate (Condition 14). All aircraft pairs not meeting Condition 14, and which are therefore expected to be out of height intrusion by the time lateral intrusion is reached, are eliminated from further present consideration.

Still further, the process includes the step of determining for each aircraft pair that meets Condition 14 (height divergence rate) and which also met Condition 4 but not Condition 5 (is in current height, but not lateral intrusion), whether the two aircraft are computed to be separated in height by a distance equal to, or less than, the height separation standard by a time computed to reach lateral intrusion (Condition 15). All aircraft pairs not meeting Condition 15 are eliminated from further present consideration and all aircraft pairs meeting Condition 15 as considered as having a potential conflict alert status. Still further, the preferred process includes the step of determining for each aircraft pair that meets Condition 14 (height divergence rate) and which did not meet either of Conditions 4 and 5 (is in neither current height nor lateral intrusion), whether the two aircraft will enter height intrusion prior to exiting lateral intrusion (Condition 16), for eliminating from further present consideration all aircraft pairs not meeting Condition 16 and for establishing all aircraft pairs meeting Condition 16 as having a potential conflict alert status.

Also in accordance with an embodiment, the process includes the step of determining for each aircraft pair that meets Condition 7 (height convergence) and which also met Condition 5 but not Condition 4 (is in current lateral, but not height, intrusion) whether the two aircraft are laterally converging at a rate equal to, or less than, a preselected lateral converging rate (Condition 9) which determines whether the two aircraft are in substantial lateral parallel flight. The process preferably further includes the step of determining for each aircraft pair that meets Condition 9 (is in lateral parallel flight) whether the two aircraft are converging in height at a rate that will result in height intrusion within a preselected look-ahead time (Condition 17), for eliminating from further present consideration all aircraft pairs not meeting Condition 17 and for establishing all aircraft pairs meeting Condition 17 as having a potential conflict alert status.

Moreover, the process also includes the step of determining for each aircraft pair that does not meet Condition 9 (is not in lateral parallel flight) whether the two aircraft will enter height intrusion prior to exiting lateral intrusion (Condition 16), for eliminating from further present consideration all aircraft pairs not meeting Condition 16 and for establishing all aircraft meeting Condition 16 as having a potential conflict alert status.

BRIEF DESCRIPTION OF THE DRAWINGS

The present invention will be more readily understood by a consideration of the accompanying drawings in which.

DESCRIPTION OF THE PREFERRED EMBODIMENT

Figure 1:
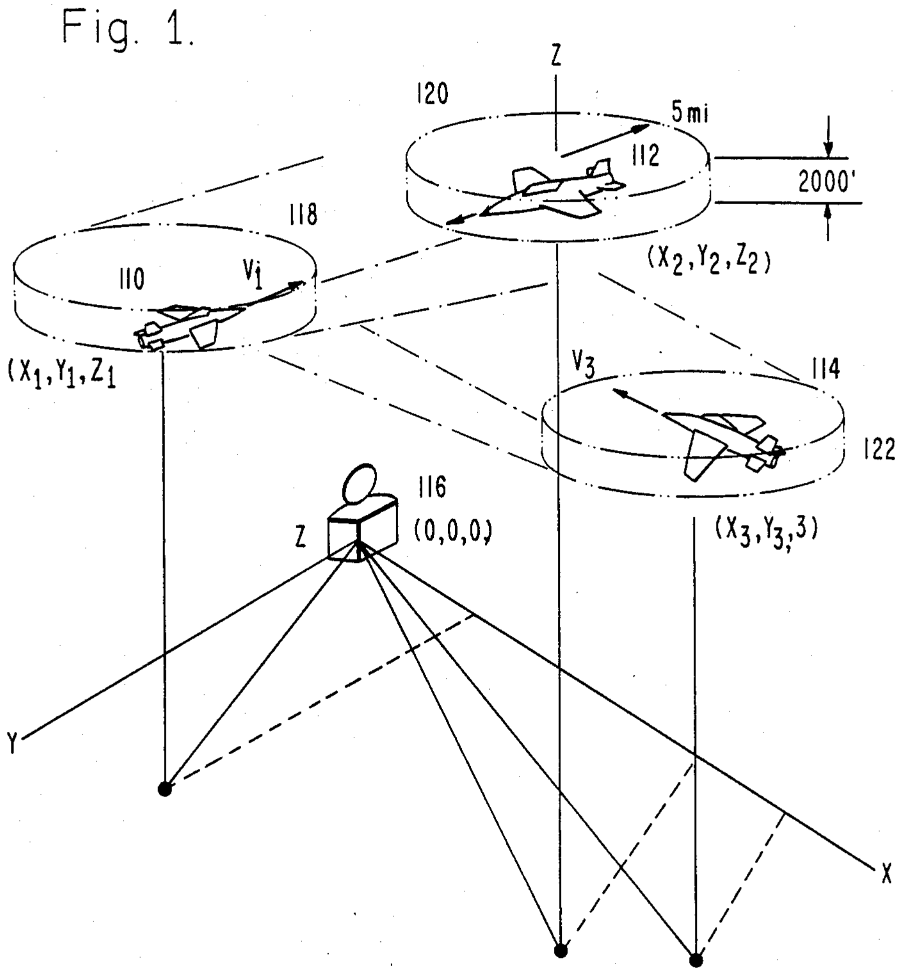
FIG. 1 is a pictorial representation of several en route aircraft at different positions and altitudes, and traveling in different directions and at different velocities, an instantaneous safety of non-intrusion airspace being depicted around each aircraft.

Depicted in FIG. 1 are representative first, second and third en route aircraft 110, 112 and 114, respectively, which are within the control sector of a particular air route traffic control center (ARTCC) depicted generally at 116. In rectangular coordinates, at a particular point in time, first aircraft 110 is at a specific (instantaneous) location ($x_1$, $y_1$, $z_1$) and is traveling at a velocity $\vec{V}_1$ relative to center 116, which may be considered as located at position ($X_o$, $Y_oZ_o$). At the same time, second aircraft 112 is at a location ($x_2$, $y_2$, $z_2$) and is traveling at a velocity $\vec{V}_2$ and third aircraft 114 is at a location ($x_3$, $y_3$, $z_3$) is traveling at a velocity $\vec{V}_3$.

Surrounding aircraft 110, 112 and 114 are respective, imaginary safety or nonintrusion zones 118, 120 and 122, shown in phantom lines. Zones 118, 120 and 122 may, as an illustration, comprise disc-shaped volumes centered at respective aircraft 110, 112 and 114, each such zone having a radius of 5 miles and a height of 2,000 feet (current FAA standards for aircraft flying at altitudes of 29,000 feet and lower). However, under different conditions the nonintrusion zones may be of different sizes. Safety or nonintrusion zones 118, 120 and 122 can be considered as always accompanying respective aircraft 110, 112 and 114 and, for purposes of predicting of predicting near-future conflicts, can be projected ahead of the aircraft in the direction of respective velocity vectors $\vec{V}_1$, $\vec{V}_2$ and $\vec{V}_3$. However, when projecting zones 118, 120 and 122 ahead, the zones are generally considered to diverge or increase in size (as indicated on FIG. 1 by phantom lines) to thereby take into account predictive errors as to near-future aircraft location.

Figure 2:
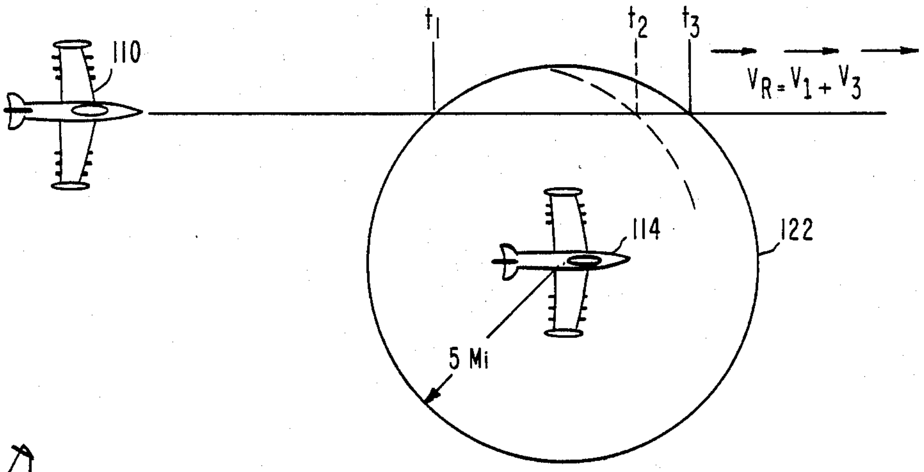
FIG. 2 is a diagram depicting the lateral intrusions by one aircraft into the nonintrusion airspace of a second aircraft.
Figure 3:
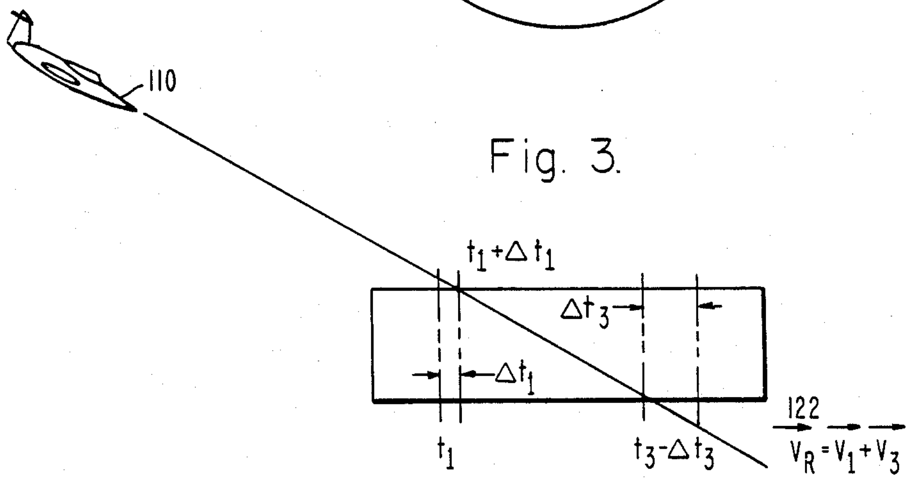
FIG. 3 is a diagram depicting one manner in which a descending aircraft may intrude through the nonintrusion airspace of another aircraft FIG. 3 looking generally along the line 3—3 of FIG. 2.

To enable a better understanding of the en route conflict alert process described herein, there are illustrated in FIGS. 2 and 3, two typical ways in which lateral and altitude separation standards between two en route aircraft can be violated. FIG. 2 illustrates, in a plan view, predicted lateral violation, by aircraft 110, of safety zone 122 of aircraft 114. For simplicity of representation, aircraft 114 is considered to be at rest and aircraft 110 is assumed to be traveling at a relative velocity $\vec{V}_R$ which is equal to the vector sum $\vec{V}_1+\vec{V}_3$. From FIG. 2, it can be seen that aircraft 110 will violate lateral separation standards relative to aircraft 114 at time $t_1$ and will remain in lateral separation violation until time $t_3$. For purposes, however, of determining the possibility of a mid-air collision, aircraft 110 can be considered to pass out of danger with respect to aircraft 114 at some earlier time $t_2$ when aircraft 110 starts moving away from aircraft 114.

All, however, that is implied in FIG. 2 is that an actual lateral separation distance violation between aircraft 110 and 114 will exist between time $t_1$ and time $t_3$. FIG. 2 does not indicate whether violation of vertical separation standards between aircraft 110 and 114 also exists, in which case, zone 122 of aircraft 114 would be violated by aircraft 110 and a conflict alert would be appropriate. Thus, for purposes of FIG. 2, an altitude projection of safety zone 122 is presumed.

Assuming, according to FIG. 2, that the lateral separation standard between aircraft 110 and 114 is violated from time $t_1$ to $T_3$, FIG. 3 then illustrates a particular manner in which the associated height separation standard may also be violated. In FIG. 3 it can be seen that at time $t_1$, when the lateral separation standard between aircraft 110 and 114 is first violated, aircraft 110 has not yet violated the height separation standard relative to aircraft 114. However, subsequently, at time, $t_1+\Delta t_1$, aircraft 110 has descended downwardly into safety zone 122, thereby creating a conflict alert status. Subsequently, by time, $t_3-\Delta t_3$, aircraft 110 has traversed completely through safety zone 122 and a conflict alert is no longer appropriate.

Accordingly, at times $t_1$ and $t_3$, when lateral separation violation is respectively entered and exited, no indication of vertical separation violation exists. It would consequently be reasonable but, as above seen, inaccurate to assume that no vertical separation violation occurred between times $t_1$ and $t_2$. The particular vertical separation violation situation depicted in FIG. 3 is, however, important to consider in the development of the present process which, as more particularly described below, first looks for any lateral separation violation and, if found, than looks for vertical separation violation.

Figure 4:
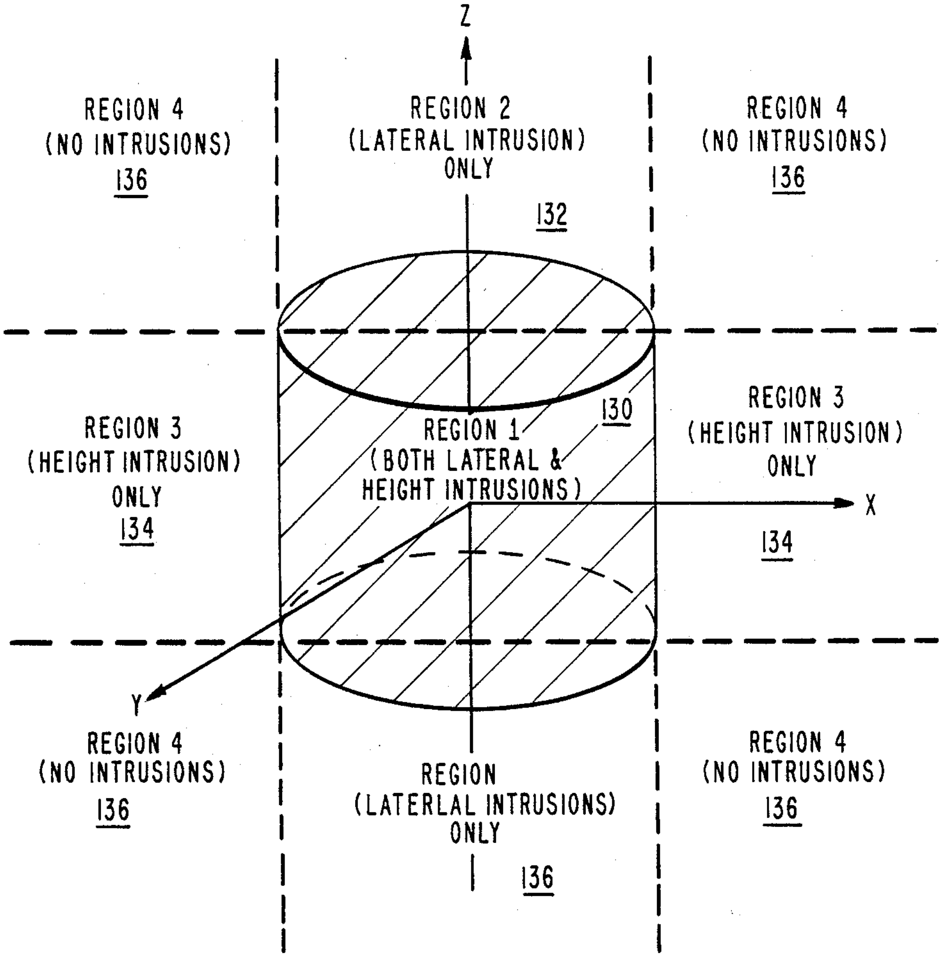
FIG. 4 is a diagram depicting the manner in which different zones of intrusion and nonintrusion are identified for the en route conflict alert process of the present invention.

For purposes of the present invention, all airspace, relative to any two en route aircraft in potential conflict, may be considered to be divided into four regions, as depicted in FIG. 4. Central Region 1 (Ref. No. 130) is a region defined by the applicable safety or nonintrusion zone and represents a cylindrical region in which both lateral and vertical (height) intrusion exists. Region 2 (Ref. No. 132) is the vertical projection of the Central Region and, therefore, comprises cylindrical regions of airspace above and below Region 1, in which only lateral intrusion can occur. Region 3 (Ref. No. 134) is the horizontal projection of Region 1 and, therefore, comprises the annular region around Region 1 in which only height intrusion can occur. Region 4 (Ref. No. 136) represents all remaining space around Region 2 and above and below Region 3 in which neither lateral nor height intrusion can occur.

The process of the present invention employs an algorithm characterized by multiple decision branching and use of height data in a manner overcoming shortcomings of present conflict alert processes. The algorithms of the present process is divided into three branches, as described more particularly below, based on the outcome of a current alert function. These three branches are: (1) aircraft of the pairs of aircraft considered are in current lateral conflict only, (2) aircraft of the pairs of aircraft considered are in current height conflict only, and (3) aircraft of the aircraft pairs considered are in neither height nor lateral conflict. If branch 1 is followed, then a statistical hypothesis test is made which asks whether a relative lateral speed, S, is equal to zero. If the hypothesis cannot be rejected, it is assumed that, since the aircraft involved are in current lateral conflict, they will continue to remain in lateral conflict for the future. A similar check is made for branch 2 which involves aircraft pairs in current height conflict. These tests of hypothesis provide stability and prediction capability in the present algorithm for precisely those cases that are impossible to analyze using previous, known formulations.

To complete the alert prediction process of the present invention, the process uses a novel approach with respect to the use of height data. Instead of computing a time until height conflict, two lateral check times are computed. If the aircraft in the involved pairs are not in current lateral conflict then these two computed times correspond to the entry and exit times of lateral conflict. If the aircraft pairs involved are in current lateral conflict, the computed times are derived from the required look-ahead times. Next, the height difference between the aircraft in the aircraft pairs under consideration is computed at these two times by extrapolating the height track data to the desired time. If the height is less than the separation standard for either time or the height difference changes sign, then the aircraft pair is declared to be in a conflict state.

This novel method of height processing, according to the present invention, is implemented to solve the problem of erratic height, as identified in the above-referenced report by The Mitre Corporation, by desensitizing the algorithm to the performance of height tracker and is, therefore, intended to provide good performance over a wide range of height tracker performance.

For purposes of applying the present process, it is assumed that all data is in cartesian coordinates using a single reference plane. Further, the present process assumes radar data that have been processed to include each aircraft's lateral position ($x_i$, $y_i$) and velocity ($\dot{x}_i$, $\dot{y}_i$) along with the position-velocity covariance matrix ($P_i$, $C_i$, $V_i$). In addition, each aircraft height data is further processed to include both height, $h_i$, and height rate, $\dot{h}_i$, along with the associated covarience matrix, $HP_i$, $HC_i$, $HV_i$. This further processing may usually be accomplished through a two-stage Kalman filter. Such techniques is known in the art and can be found in most general texts on digital signal processing, for example, Signal Processing Techniques, by Russ Roberts, Interstate Electronics Corporation, 1977, Chapter 8.

More specifically there is shown in FIG.. 5(*a*)-(*f*) a flow diagram of the en route conflict alert process of the present invention. In general, a sequence of 17 decisional steps are "tested" with respect to each "eligible" pair of aircraft involved. At each step, an exclusive decision is made as to whether there exists; (i) no current or predicted conflict (Condition "A"); (ii) whether there is a predicted conflict (Condition "B") or (iii) whether there exists a current violation (i.e., a conflict) (Condition "C"). Each process step functions as a test or "filter," those pairs of aircraft "failing" test (i.e., do not pass through the filter) are exited as meeting one of the above-cited Conditions "A," "B," or "C." Those pairs of aircraft "passing" the test or filter proceed to the next-in-sequence test or filtering step. Abbreviations and symbols used in the flow diagram of FIG. 5, which shows the computations performed at each step, are identified in Table 1 below. Listed in Table 2 below are various exemplary parameter values which in one instance have been used in the computations shown in FIG. 5.

Figure 5:
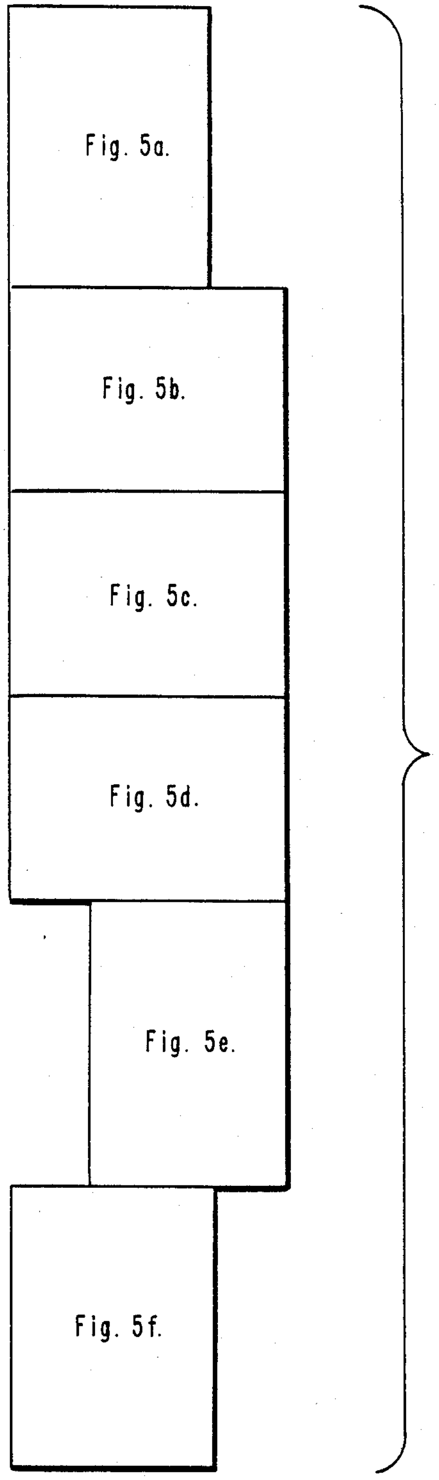
FIG. 5 is a flow chart of the conflict alert algorithm used in the en route conflict alert process of the present invention, FIG. 5 being divided into FIGS. 5(*a*)-(*f*), each of which show part of the flow chart.

For ease in explanation and traceability through the flow diagram on FIG. 5, each possible path through the process is identified by a unique "state" number from 1 through 27. The state number followed y a "P" for pass or an "F" for fail represents the next subsequent state (or exit) for subsequent processing. The process depicted in FIG. 5 is organized by state number; although the process descriptions are combined for multiple states.

The description of the process flow diagram of FIG. 5 is as follows:

Process Step No. 1, Gross Height Filter (FIG. 5'a)

The aircraft pairs being tracked must have a height separation equal or less than a preestablished distance, for example, 13,500 feet (0209), to be further processed. Aircraft pairs (1F) having height separation of greater than the exemplary 13,500 feet are exited as "no conflict" (Condition "A"). The expectation is that if the height separation is greater than 13,500 feet, it is improbable that the aircraft could meet within, for example, the next 90 seconds (Q223) of time applied to determine predicted conflict alerts. Pairs (1P) of aircraft "passing" this test are passed to Process Step 2 for further evaluation as to conflict status.

Figure 5A:
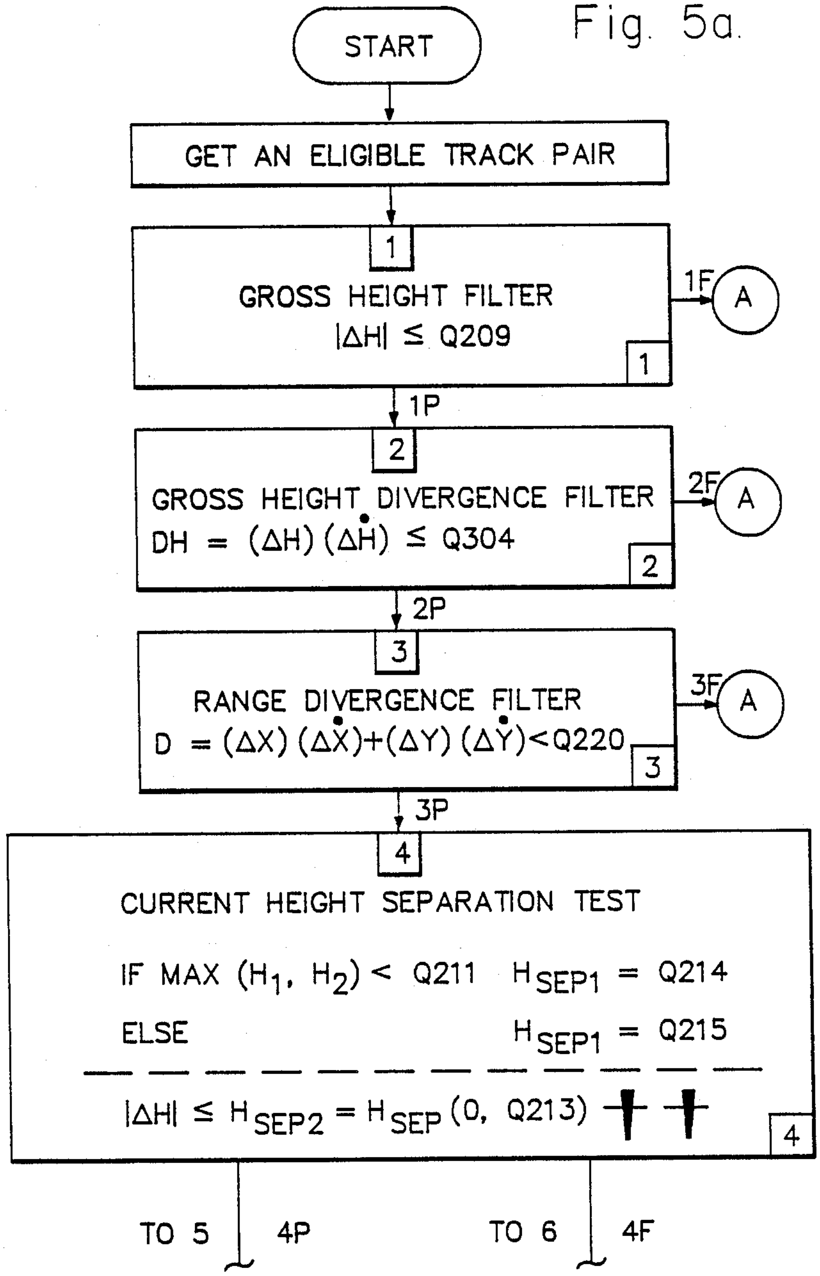

Process Step 2, Gross Height Divergence Filter (FIG. 5*a*)

Aircraft pairs (1P→2) currently separated in height by the exemplary 13,500 feet or less, must be converging in height or must be only slightly diverging in height at a rate equal or less than a preestablished rate, for example, 1,000 ft$^2$/sec (Q304). Aircraft pairs (2F) not "passing" this test are exited as "no conflict" (Condition "A"). For potential, near-future conflict, the aircraft pairs must be converging in height; however, due to possible tracking errors, the aircraft pairs might appear to be slightly diverging when they are, in fact, actually converging. This step causes aircraft pairs (2P) which are converging in height, or are only slightly diverging in height, to be further considered in Process Step 3 for possible conflict.

Process Step 3, Range Divergence Filter (FIG. 5*a*)

Aircraft pairs (2P→3) currently within the exemplary 13,500 feet in height separation and converging, or not excessively diverging, in height must be laterally converging or must be only slightly laterally diverging at a preestablished rate, for example, equal or less than 0.015 nmi$^2$/sec (Q220) to be considered for further processing for conflicts. Otherwise, the aircraft pairs (3F) are exited as "no conflict" (Condition "A"). For potential, near-future conflict, the aircraft pairs must be converging laterally; however, due to possible tracking errors, the aircraft pairs might appear to be slightly laterally diverging, when, in fact, they are actually converging. This step causes aircraft pairs (3P) which are laterally converging or are only slightly laterally diverging to be further considered for conflicts in Process Step 4.

Process Step 4, Current Height Separation Test (FIG. 5*a*)

Aircraft pairs (3P→4) currently within the exemplary 13,500 feet in height separation and converging both in height and laterally, or not excessively diverging either in height or laterally, are tested to determine if the pairs are in or out of current height intrusion as defined by the height separation criteria plus possible errors. Aircraft are either in current height intrusion (pass) (4P) or are not (fail) (4F); however, in either case, the aircraft pairs (4P and 4F) are further evaluated in Process Step 5 for lateral intrusion or for possible near-future conflict.

Process Step 5, Current Lateral Separation Test (FIG. 5)

Aircraft pairs (4P→5 and 4F→6) currently within the exemplary 13,500 feet of height separation and converging both in height and, laterally or not excessively diverging in either height or laterally are tested to determine if the aircraft pairs are in current lateral intrusion, as determined by the lateral separation criteria plus probable errors. Those pairs of aircraft which are in current height intrusion (5) and are determined to be in current lateral intrusion are exited as "current violation" (5P) (Condition "C"). The remaining aircraft pairs, including those pairs (5F) in current height intrusion which "fail" the current lateral separation test (that is, are not in current lateral intrusion) and those pairs not in current height intrusion which either "pass" (6P) or "fail" (6F) the current lateral separation test, are subjected to additional evaluation for projected intrusions in Process Step 6.

Figure 5B:
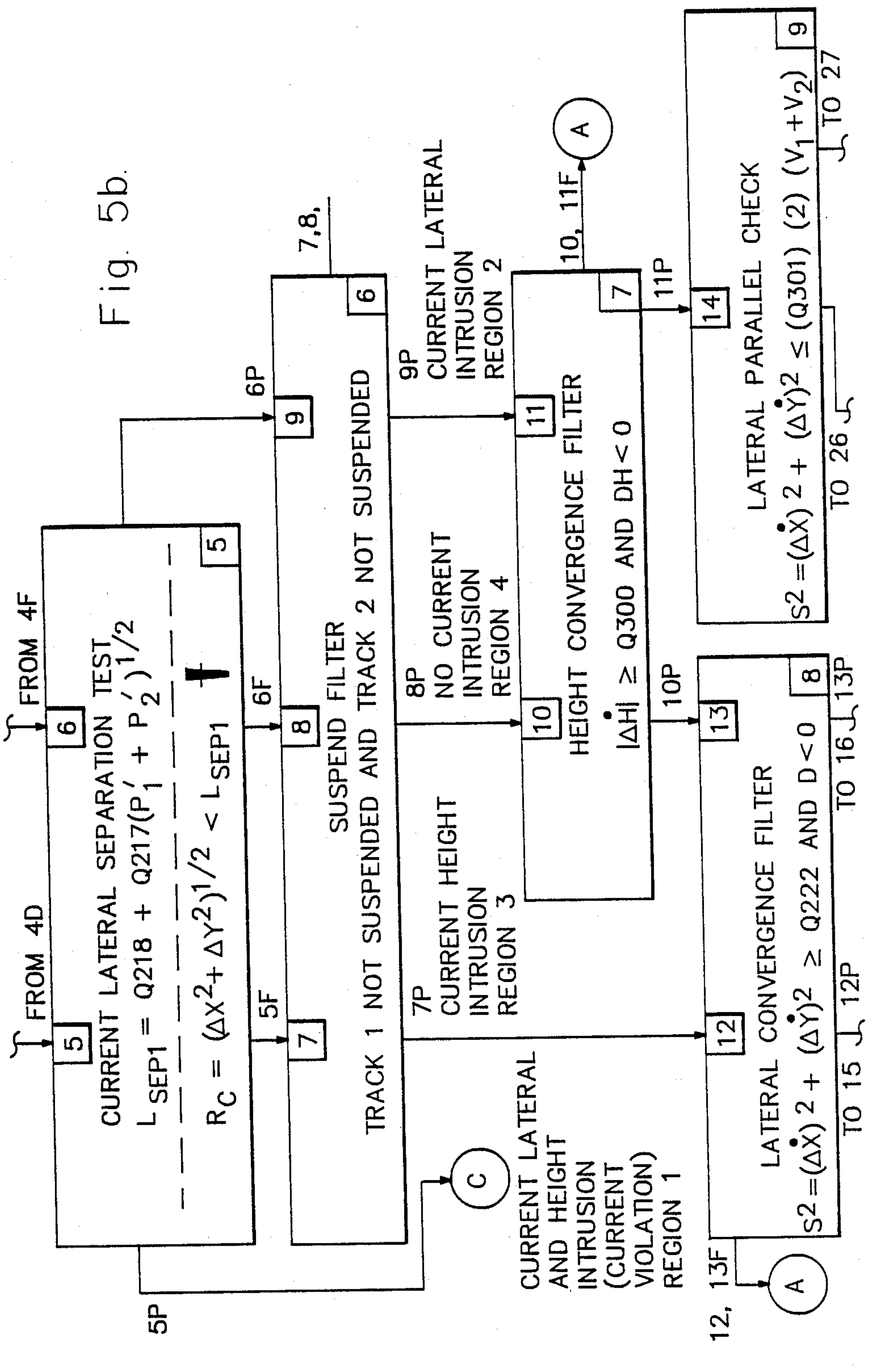

Process Step 6, Suspend Filter (FIG. 5*b*)

All aircraft pairs (5F→7, 6F→9) which are currently within the exemplary 13,500 feet of height separation, are converging laterally and in height or are not excessively diverging laterally or in height and which are:

(i) are in current height intrusion but not in current lateral intrusion (5F→7), or (ii) in neither height nor lateral intrusion (6F→8), or (iii) in current lateral intrusion but not in current height intrusion (6P→9), are examined to determine if either aircraft of each pair are in "suspension," that is, whether either aircraft is in a holding pattern and is therefore likely to be maneuvering frequently. Conflict predictions as to such pairs is expected to be unreliable and if both aircraft in a pair are in a suspended status, attempts to predict future conflicts are meaningless. Such pairs therefore "fail" the test and are exited as "no conflict" (7F, 8F, 9F) (Condition "A"). Aircraft pairs which "pass" the both-aircraft-not-in-suspension test (that is, neither or only one aircraft is in suspension) are further evaluated. Those passing pairs (7P) which are in current height intrusion but not in current lateral intrusion are passed to Process Step 8 for further processing for conflicts. All the other passing pairs (8P and 9P) are passed to Process Step 7 for further evaluation as to conflicts.

Process Step 7, Height Convergence Filter (FIG. 5*a*)

All aircraft pairs (8P→10 and 9P→11) currently within the exemplary 13,500 feet of height separation and converging laterally and in height or are not excessively diverging laterally or in height and which are:

(i) not in current height or lateral intrusion (8P→10), or (ii) in current lateral intrusion but not in current height intrusion (9P→11), are checked to determine if the aircraft in each pair under consideration are converging in height at a preestablished speed of, for example, greater than 5 ft/sec (Q300). Since the aircraft pairs under consideration have already been determined to have acceptable height separation, any height divergence and any height convergence at a rate less than the exemplary 5 ft/sec (a speed too unreliable to be used for subsequent prediction) "fail" the test and are exited as "no conflict" (10F, 11F) (Condition "A"). Those passing aircraft pairs which are not in current height or lateral intrusions (10P) are passed to Process Step 8 for further evaluation as to conflicts. Those passing aircraft pairs which are in current lateral intrusion but not in current height intrusion (11P) are passed to Process Step 9 for further evaluation as to conflicts.

Process Step 8, Lateral Convergence Filter (FIG. 5*b*)

All aircraft pairs (7P→12 and 10P→13) currently within the exemplary 13,500 feet of height separation, converging laterally and in height or not excessively diverging laterally or in height and which are:

(i) are in current height but not in current lateral intrusion (7P→12), or (ii) not in current height or lateral intrusion but are converging in height at more than the exemplary 5 ft/sec (10P→13), are checked to determine if the involved aircraft are converging laterally at a preestablished rate, for example, of greater than 50 knots (Q222=0.0001907 $nmi^2/\text{-}sec^2$). The intent is the same as above described for Step 7. Those aircraft pairs which fail the test (12F, 13F) by laterally diverging or by laterally converging at a speed of less than the exemplary 50 knots are exited as "no conflict" (Condition "A"). Those aircraft pairs passing the test (12P, 13P) are passed to Process Step 10 for further evaluation as to conflicts.

Process Step 9, Lateral Parallel Check (FIG. 5*b*)

All aircraft pairs (11P→14) within the exemplary 13,500 feet of height separation, converging laterally or not excessively diverging laterally and are converging in height at more than the exemplary 5 ft/sec are checked to determine if the pairs should be treated as being in parallel flight. If the aircraft are already in lateral intrusion and the relative speed between the pair is low, it is assumed that the pair will remain in lateral intrusion in the near future. Also, as relative speeds approach zero, time computations become very unstable. Those failing aircraft pairs (14F) for which the paths are determined not be parallel are further examined for height differences in Process Step 16. Those passing pairs (14P) for which the paths are determined to be parallel are further examined in Process Step 17 for height difference.

Figure 5C:
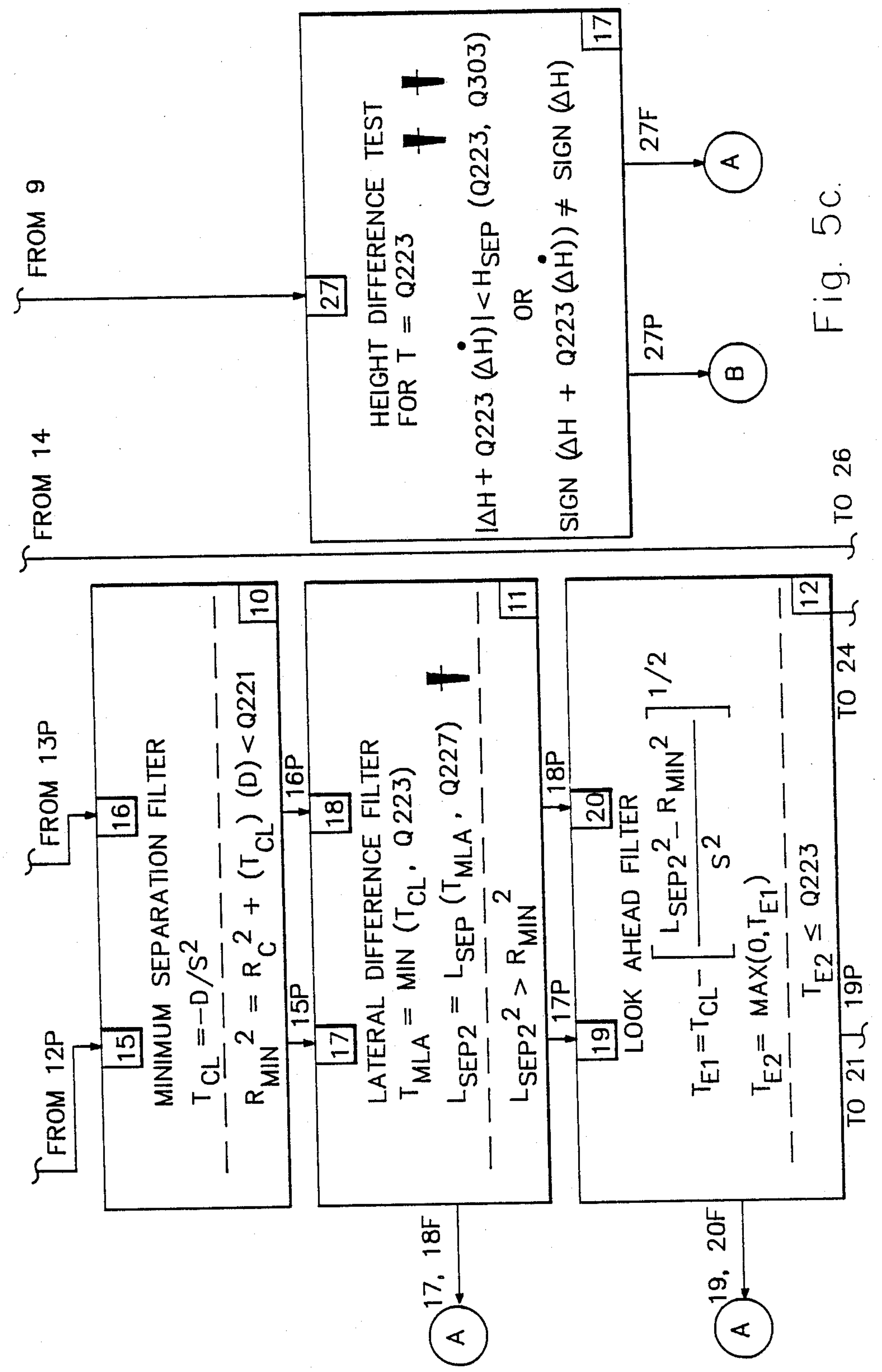

Process Step 10, Minimum 13 Separation Filter (FIG. 5*c*)

Aircraft pairs (12P→15 and 13P→16) that are within the exemplary 13,500 feet of height separation, are converging laterally at more than the exemplary 50 knots, are converging in height at more than the exemplary 5 ft/sec and which are:

(i) in current height but not current lateral intrusion (12P→15), or (ii) not in current height or lateral intrusion (13P→16), are tested for a preestablished minimum lateral separation of, for example, 6 nmi (Q221=36 $nmi^2$) at their point of closest approach. If the lateral separation is greater than the exemplary 6 nmi, there is little possibility (even with track errors) that the aircraft pair will violate lateral separation standards within the look-ahead time. Aircraft pairs failing the test (15F, 16F) are thus exited as "no conflict" (Condition "A"). Aircraft pairs passing the test (15P, 16P) are further evaluated for conflict in Process Step 11.

Process Step 11, Lateral Difference Filter (FIG. 5c)

All aircraft pairs (15P→17, 16P→18) currently within the exemplary 13,500 feet of height separation, are converging laterally at more than the exemplary 50 knots, are converging in height at more than the exemplary 5 ft/sec, have a minimum lateral separation less than the exemplary 6 nmi and which are:

(i) in current height but not in current lateral intrusion (15P→17), or (ii) not in current height or lateral intrusion (16P→18), are evaluated to determine whether the minimum separation of the paths will penetrate a separation volume computed using a maximum preselected look-ahead time of, for example, 90 (Q223) seconds to expand the tracking error estimates. Aircraft pairs failing the test (17F, 18F) are exited as "no conflict" (Condition "A"). Those aircraft pairs passing the test (17P, 18P) are further evaluated in Process Step 12 for near-future conflicts.

Process Step 12, Look-Ahead Filter (FIG. 5c)

All aircraft pairs (17P→19, 18P→20) which are currently within the exemplary 13,500 feet of height separation, are laterally converging at more than the exemplary 50 knots, are converging in height at more than the exemplary 5 ft/sec, have a minimum separation which will penetrate the maximum separation standard and which are:

(i) in current height intrusion but not current lateral intrusion (17P→19), or (ii) not in current height or lateral intrusion (18P→20), are checked to determine whether the time to lateral violation of the maximum separation standard is less than the exemplary 90 (Q223) second look ahead time. The intent is to eliminate aircraft pairs where the possible conflict is too far in the future for accurate conflict prediction. By using a maximum dynamic separation standard, the shortest possible time is computed. Aircraft groups failing the test (19F, 20F) are exited as "no conflict" (Condition "A"). Passing aircraft pairs which are in current height but not lateral intrusion (19P) are passed to Process Step 13 for further near-future conflict evaluation. Passing aircraft pairs in neither current height nor lateral intrusion (20P) are passed to Process Step 14 for further conflict evaluation.

Figure 5D:
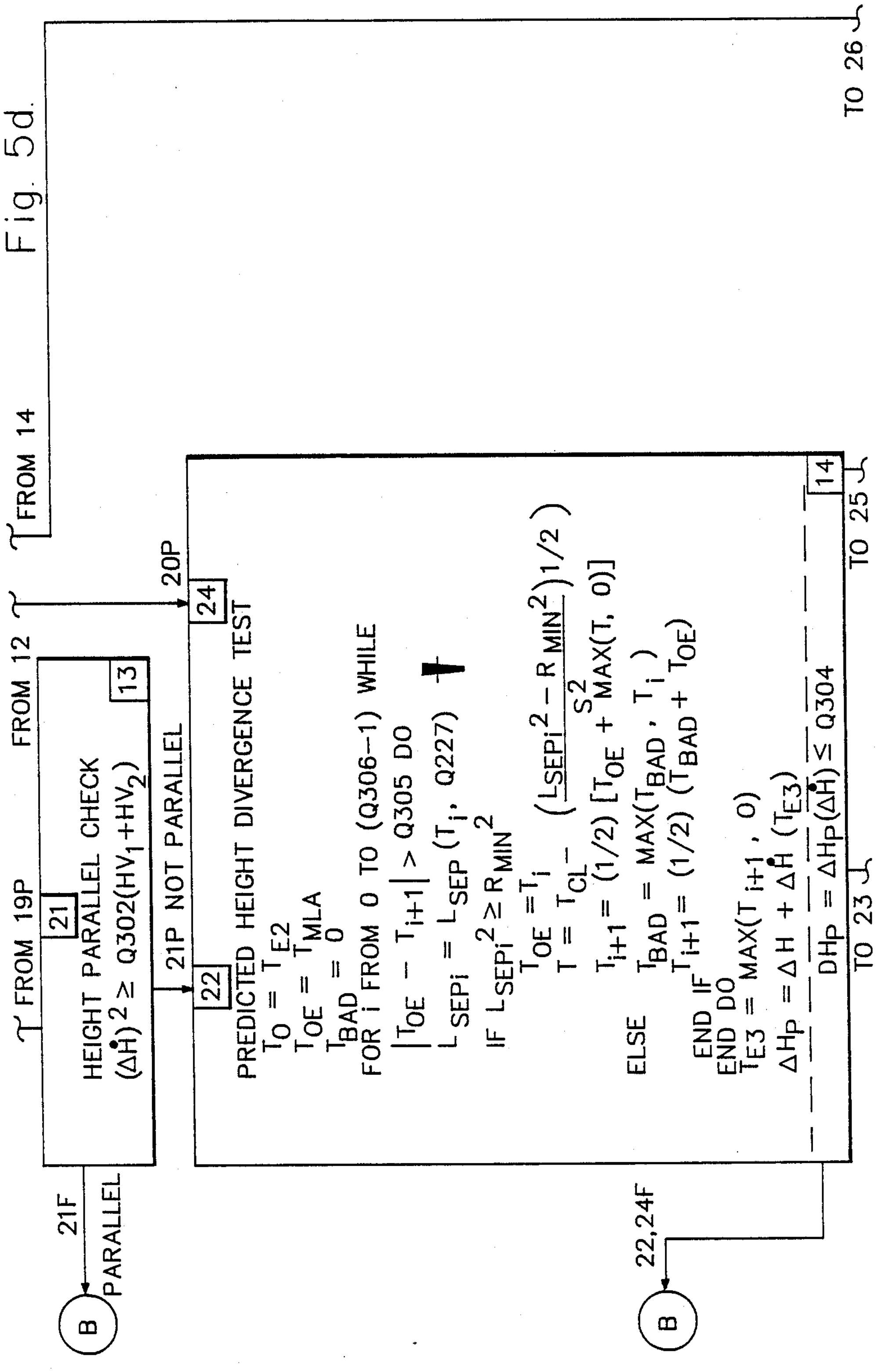

Process Step 13, Height Parallel Check (FIG. 5d)

All aircraft pairs (19P→21) which are currently within the exemplary 13,500 feet of height separation, are laterally converging at more than the exemplary 50 knots, have a minimum separation which will penetrate the maximum separation standard, are in current height intrusion but not current lateral intrusion, and which will enter lateral intrusion within the exemplary 90 seconds are evaluated to determine if the pairs are converging at a rate greater than a preselected rate or whether the two aircraft involved are in substantially parallel height flight. Since the aircraft pairs have already been determined to be in height intrusion, if the relative height converging rate is very small (i.e., the test of this step is not met), it is assumed that the pair will remain in height intrusion in the near future. If so, a predicted conflict is expected since a lateral intrusion is also expected within 90 seconds. Aircraft pairs failing this teat (21F) are exited at "predicted conflict" (Condition "B"). Aircraft pairs (21P) passing the test (that is, not parallel) are further evaluated in Process Step 14.

Process Step 14, Predicted Height Divergence Test (FIG. 5d)

All aircraft pairs (21P→22, 20P→24) which are currently within the exemplary 13,500 feet of height separation, are laterally converging at more than the exemplary 50 knots, have a maximum lateral separation which will penetrate the maximum separation standard, are not in current lateral intrusion, will enter lateral intrusion within the exemplary 90 seconds and which are:

(i) in current height intrusion and are not height parallel (21P→22), or (ii) not in current height intrusion and are converging in height at more than the exemplary 5 ft/sec (20P→24), are evaluated to determine whether the aircraft are excessively divergent in height by the time they enter lateral intrusion. If the two aircraft in any pair are diverging significantly in height by the time they enter lateral intrusion, the situation is considered safe. A more refined computation is done to determine the time-until-lateral-intrusion; the height separation is predicted to this time and the divergence is then computed using the same concept as for the Gross Height Divergence Filter (Step 2). Aircraft pairs "failing" this text (22F, 24F) are exited as "no conflict" (Condition "A"). Aircraft pairs passing this test which are in current height intrusion and are not height parallel (22P) are further evaluated for near-future conflict in Process Step 23. Aircraft pairs passing this test which are not in current height intrusion and are converging in height at more than 5 ft/sec (24P) are further evaluated in Process Step 16.

Process Step 15, Height Exit Test (FIG. 5f)

All aircraft pairs (22P→23) which are currently within the exemplary 13,500 feet of height separation, are laterally converging at more than the exemplary 50 knots, have a minimum separation which will penetrate the maximum separation standard, are not in current lateral intrusion, will enter lateral intrusion within the exemplary 90 seconds, are in current height intrusion, are not height parallel and will not be excessively divergent in height by time-until-lateral-conflict are evaluated to determine if the aircraft are adequately separated in height by the time they enter lateral intrusion. Since each pair of aircraft being considered is already in current height intrusion, if the predicted height separation at the time of lateral intrusion is no longer represents a height intrusion, the situation is safe and aircraft pairs failing this test (23F) are exited as "no conflict" (Condition "A"). Aircraft pairs passing the test (23P) are exited as "predicted conflict" (Condition "B").

Figure 5E:
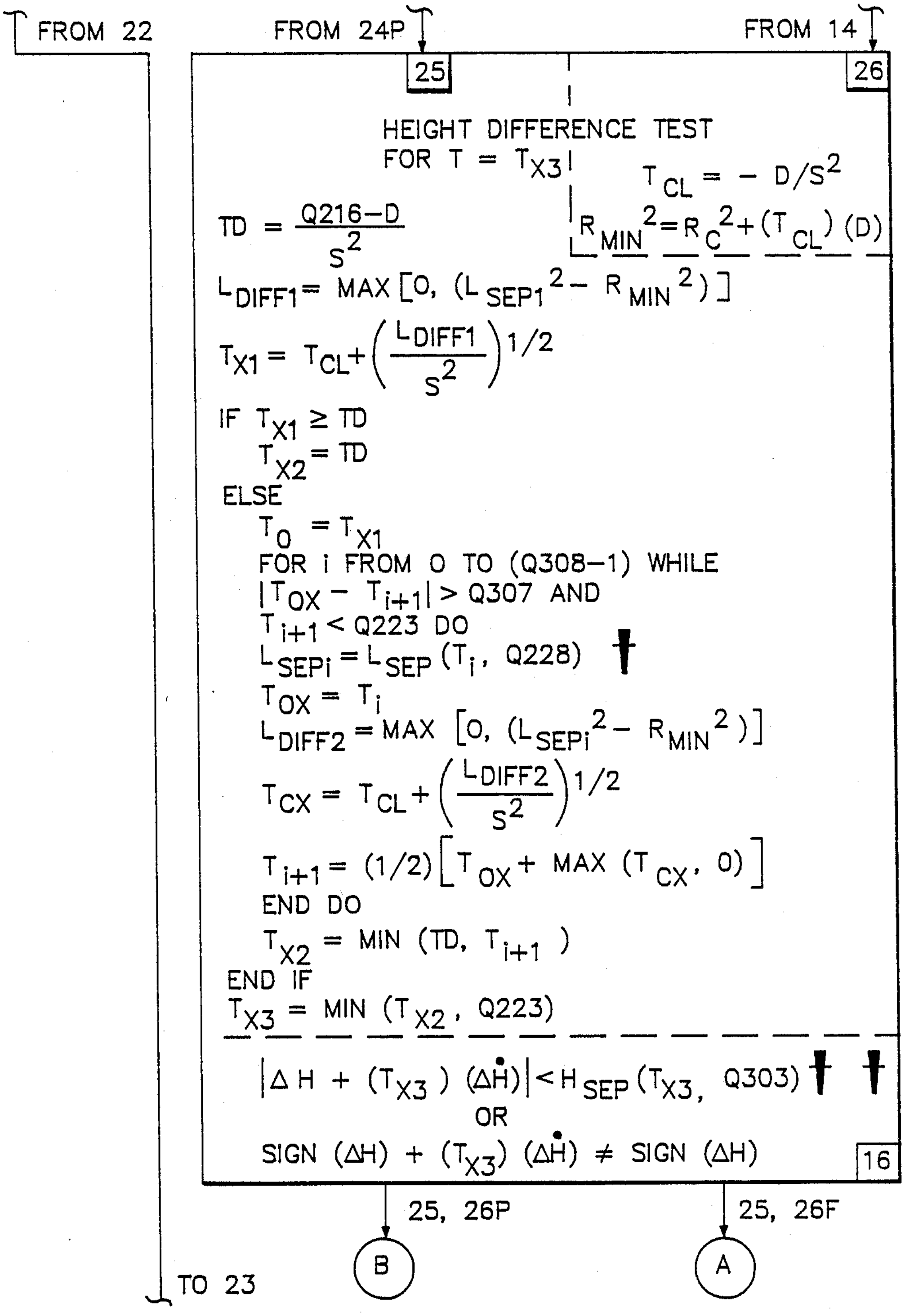

Process Step 16, Height Difference Test for $T_{x3}$ (FIG. 5e)

All aircraft pairs (24P→25, 14F→26 from respective steps 23 and 9) which are currently within the exemplary 13,500 feet of height separation, are not in current height intrusion, are converging in height at more than the exemplary 5 ft/sec and which are:

(i) not in current lateral intrusion, have a minimum separation which will penetrate the maximum separation standard, will enter lateral intrusion within the exemplary 90 seconds, and will not be excessively divergent in height by time-until-lateral-conflict (24P→25), or (ii) are in current lateral intrusion and are not laterally parallel (14F→26), are evaluated to determine if the aircraft in any pair will enter height intrusion prior to exiting lateral intrusion. The aircraft pairs are considered to be safe if they are diverging significantly even through the aircraft involved are technically still in lateral intrusion. The time is truncated, for example, to 90 seconds, for maximum look-ahead and the height separation is computed to this point in time. The test appears to be more complicated than it actually is because it accounts for the case in which one path passes entirely though the other path's separation "band" between the current time and the time of lateral exit. Aircraft pairs "failing" the test (22F, 26F) are exited as "no conflict" (Condition "A"). Aircraft pairs passing the test (25, 26P) are exited as "predicted conflict" (Condition "B").

Process Step 17, Height Difference Test for $T=\phi 233$ (FIG. 5*c*)

All aircraft pairs (14P→27 from step 9) which are currently within the exemplary 13,500 feet of height separation, are not in current height intrusion, are converging in height at a rate of more than the exemplary 5 ft/sec, are in current lateral intrusion and are laterally parallel are evaluated to determine if the aircraft involved will enter height intrusion within the exemplary 90 seconds. Since each aircraft pair has already been determined to be in current lateral intrusion and is likely to remain so (since the aircraft involved are laterally parallel), the only check needed is to determine if a height intrusion will occur within 90 seconds. Aircraft pairs "failing" the test (27F) are exited as "no conflict" (Condition "A"). Aircraft pairs passing the test (27P) are exited as "potential conflict" (Condition "B").

It will, of course, be understood that the above-described "filtering" process is continually repeated and the exiting of any aircraft pair as "no conflict" during any one "filtering" cycle does not necessarily eliminate the aircraft from consideration during a next or subsequent filtering cycle. Also, it is to be understood that each aircraft may be paired with more than one other aircraft, depending upon aircraft location, altitude and velocity. Each such pair is treated separately and, for example, the exiting of the aircraft in one pair as "no conflict" does not necessarily exit either of these same aircraft as "no conflict" in other pairs involving these aircraft.

For purposes of enabling "filtering" computations, to be made values for various parameters, for example, 13,500 feet of height separation for Process Step 1, have been assumed. Such assumptions are based upon experience and/or specific requirements. The present invention is not, however, limited to the use of any particular values or sets of values, the values used herein being merely by way of a specific example illustrating the process.

Although there has been described above a particular process for en route aircraft conflict alert determination and prediction for purposes of illustrating the manner in which the present invention may be used to advantage, it is to be understood that the invention is not limited thereto. Accordingly, any and all variations or modifications which may occur to those skilled in the art are to be considered as being within the scope and spirit of the appended claims.

TABLE I

| TERM | DEFINITION | EXPRESSION |
|---|---|---|
| a | Predicted $P_j$ of Track j, j = 1, 2 | $P_j + 2*TV_j*C_j + TV_j*V_j$ |
| b | Predicted $HP_j$ | $HP_j + 2*THV_jHC_j + THV_j*HV_j$ |
| $C_j$ | Position-Velocity Error Covariance of Track j; j = 1,2 | |
| D | In-Plane Range Divergence Value | $(\Delta X)(\Delta\dot{X}) + (\Delta Y)(\Delta\dot{Y})$ |
| DH | Height Divergence Value | $(\Delta H)(\Delta\dot{H})$ |
| $DH_p$ | Predicted DH for $\Delta H_p$ | $(\Delta H_p)(\Delta\dot{H})$ |
| $\Delta H$ | Current Height Separation of Track Pair | $H_1 - H_2$ |
| $\Delta\dot{H}$ | Difference of Height Rate | $\dot{H}_1 - \dot{H}_2$ |
| $\Delta H_p$ | Predicted Height Separation at $T_{E3}$ | $\Delta H + \Delta\dot{H}*T_{E3}$ |
| $H_j$ | Current Height (Altitude) of Track j | |
| $\dot{H}_j$ | Current Height Rate of Track j | |
| $HC_j$ | Height Position-Velocity Error Covariance of Track j | |
| $H_{MAX}$ | Maximum Height of any Track | |
| $HP_j$ | Height Position Error Variance of Track j | |
| $HP_{pj}$ | Predicted $HP_j$ of Track j for Height Separation Function | MIN (b, Q226) |
| $H_{SEP}$ (T,M) | Height Separation Function: Computes Height Separation at Time T with Multiplier M | $H_{SEP1} + M(HP_{P1} + HP_{P2})^{\frac{1}{2}}$ |
| $H_{SEP1}$ | Height Separation Criteria | Q214 if max $H_j$ < Q211, Q215 Otherwise |
| $H_{SEP2}$ | Height Separation Criteria with Current Errors (Time 0) and Height of Intrusion Cylinder above Track 1 | $H_{SEP}$(0,Q213) |
| HV | Height Velocity Error Variance of | |

TABLE I-continued

| TERM | DEFINITION | EXPRESSION |
|---|---|---|
| | Track j | |
| i | General Term of an Iteration | As used |
| $L_{DIFF1}$ | First Lateral Difference Parameter for Height Difference Test | MAX [$0_2$, ($L_{SEP1}$ − R $MIN^2$)] |
| $L_{DIFF2}$ | Second Lateral Difference Parameter for Height Difference Test | MAX [$0_2$, ($L_{SEPi}$ − R $MIN^2$)] |
| $L_{SEP}$ (T,M) | Lateral Separation Function: Computes Lateral Separation at Time T with Multiplier M | $Q218 + M(P_{P1} + P_{P2})^{\frac{1}{2}}$ |
| $L_{SEPi}$ | ith iteration of $L_{SEP}$(T,M) | $L_{SEP}$ ($T_i$, Q227 or Q228) |
| $L_{SEP1}$ | Lateral Separation Criterion with Current Errors (time 0) and Radius of Lateral Intrusion Cylinder | $Q218 + Q217 (P_1^* + P_2^*)^{\frac{1}{2}}$ |
| $L_{SEP2}$ | Lateral Separation Criterion with Predicted Errors at Time $T_{MLA}$ | $L_{SEP}$($T_{MLA}$,Q227) |
| M | General Term for Multiplier | As Used |
| $P_j^*$ | Extrapolated Position Error Variance of Track j | |
| $P_{pj}$ | Predicted $P_j$ of Track j for Lateral Separation Function | MIN (a, Q225) |
| $R_C$ | Current Lateral Track Pair Separation (Range) | $(\Delta X^2 + \Delta Y^2)^{\frac{1}{2}}$ |
| $R_{MIN}^2$ | Square of Predicted Minimum Separation | $R_C^2 + T_{CL} * D$ |
| $S^2$ | Squared Relative Track Speed | $\Delta\dot{X}^2 + \Delta\dot{Y}^2$ |
| T | General Term for Time | As Used |
| $T_{BAD}$ | Largest Time which leads to the Computation of an Imaginary (Bad) Sq. Root | Inital Value = 0 MAX ($T_{MAD}$, $T_i$) |
| $T_{CL}$ | Time of Closest Lateral Approach | $-D/S^2$ |
| $T_{CX}$ | Time of Exit from Lateral Intrusion with $L_{DIFF2}$ | $T_{CL} + (L_{DIFF2}/S^2)^{\frac{1}{2}}$ |
| TD | Time to Excessive Divergence | $(Q216\text{-}D)/S^2$ |
| $T_{E1}$ | Time of Entry into Lateral Intrusion with $L_{SEP2}$ | $T_{CL} - [(L_{SEP2}^2 - R_{MIN}^2)/S^2]^{\frac{1}{2}}$ |
| $T_{E2}$ | Time of Entry into Lateral Intrusion | MAX (O, $T_{E1}$) |
| $T_{E3}$ | Time of Entry into Lateral Intrusion | MAX ($T_{i+1}$, O) |
| $THV_j$ | Time Adjustment for Extrapolation of $HP_j$ to Time T | $T - T_{LHUPDj} + T_{REF}$ |
| $T_i$ | ith Iteration of Time | As Used |
| $T_{i+1}$ | (i + 1)th Iteration of Time | As Used |
| $T_{LUPDj}$ | Time of Last Update of Track Height | |
| $T_{LHUPDj}$ | Time of Last Update of Track Position | |
| $T_{MLA}$ | Maximum Look-Ahead Time | MIN($T_{CL}$, Q233) |
| TO | Initial Time Value for: | |
| | Height Divergence Test | $T_{E2}$ |
| | Height Difference Test | $T_{X1}$ |
| $T_{OE}$ | Last Entry Time which Leads to the Computation of a Real (Good) Square Root | $T_{MLA}$ = Initial Value; $T_i$ thereafter |
| $T_{OX}$ | Last Exit Time which Leads to the Computation of a Real (Good) Square Root | $T_i$ |
| $T_{REF}$ | Correlation Reference Time | |
| $TV_j$ | Time Adjustment for Extrapolation of $P_j$ to Time T | $T - T_{LUPDj} + T_{REF}$ |
| $T_{X1}$ | Time of Exit from Lateral Intrusion using Current Errors | $T_{CL} + (L_{DIFF1}/S^2)^{\frac{1}{2}}$ |
| $T_{X2}$ | Time of Exit from Lateral Intrusion of Excessive Divergence | TD or MIN (TD, $T_{i+1}$) |
| $T_{X3}$ | Time of Exit from | MIN ($T_{X2}$, Q223) |

TABLE I-continued

| TERM | DEFINITION | EXPRESSION |
|---|---|---|
| | Lateral Intrusion Bounded by Q233 | |
| $V_j$ | Velocity Error Variance for Track j | |
| X | X-Coordinate of Current Track Position | |
| Y | Y-Coordinate of Current Track Position | |
| ΔX | X-Coordinate Separation of Track Pair | $X_1 - X_2$ |
| ΔY | Y-Coordinate Separation of Track Pair | $Y_1 - Y_2$ |
| $\Delta\dot{X}$ | X-Component of Relative Velocity | $\dot{X}_1 - \dot{X}_2$ |
| $\Delta\dot{Y}$ | Y-Component of Relative Velocity | $\dot{Y}_1 - \dot{Y}_2$ |

TABLE 2

| ID | DESCRIPTION | UNITS | NOMINAL VALUE |
|---|---|---|---|
| Q209 | CA Gross Height Filter Distance | Feet | 13500 |
| Q211 | CA Altitude Threshold Level | Feet | 29000 |
| Q213 | CA Current Height Test Scaling Parameter | NA | 1.5 |
| Q214 | Low Height Separation Criterion | Feet | 750 |
| Q215 | High Height Separation Criterion | Feet | 1750 |
| Q216 | Time to Range Divergence Parameter | (nmi/$^2$/sec | 0.175 |
| Q217 | CA Current Lateral Test Scaling Parameter | NA | 1.5 |
| Q218 | CA Lateral Separation Criterion | nmi | 4.5 |
| Q220 | CA Range Divergence Filter Parameter | $(nmi)^2$/sec | 0.15 |
| Q221 | CA Minimum Separation Filter Parameter | $(nmi)^2$ | 36 |
| Q222 | CA Lateral Convergence Filter Rate | $(nmi)^2/(sec)^2$ | 0.0001907 |
| Q223 | Maximum CA Look-Ahead Time | Seconds | 90 |
| Q225 | Upper Bound on CA Predicted Track Position Variance | $(nmi)^2$ | .25 |
| Q226 | Upper Bound on CA Predicted Track Height Position Variance | $(feet)^2$ | 10000 |
| Q227 | CA Predicted Lateral Test Scaling Parameter | NA | 1.5 |
| Q228 | CA Predicted Height Difference Test Scaling Parameter | NA | 1.5 |
| Q300 | Minimum Height Convergence Rate | ft/sec | 5.0 |
| Q301 | Lateral Parallel Check Parameter | NA | 6.0 |
| Q302 | Height Parallel Check Parameter | NA | 2.71 |
| Q303 | Height Difference Test Parameter | NA | 2.00 |
| Q304 | Height Divergence Parameter | $(ft)^2$/sec | 1000 |
| Q305 | Predicted Height Divergence Test Parameter | sec | 6.0 |
| Q306 | Predicted Height Divergence Iteration Parameter | NA | 10 |
| Q307 | Height Difference Test Parameter | sec | 6.0 |
| Q308 | Height Difference Iteration Parameter | NA | 10 |

What is claimed is:

1. A process for determining en route airspace conflict alert status for a plurality of airborne aircraft for which the position, altitude and velocity of each aircraft are monitored in a substantially continuous manner and for which a height separation standard and lateral separation standard exists, the process comprising:
   (a) pairing each said aircraft with at least one other of said aircraft to form at least one aircraft pair to be considered for conflict alert status;
   (b) determining for each said aircraft pair whether the two aircraft involved meet the conditions of:
      (i) having a height separation equal to, or less than, a preselected gross height separation distance (Condition 1),
      (ii) converging in height or diverging in height at a rate equal to, or less than, a preselected small height diverging rate (Condition 2),
      (iii) converging laterally or diverging laterally at a rate equal to, or less than, a preselected small lateral diverging rate (Condition 3),
      (iv) having a height separation equal to, or less than, said height separation standard (Condition 4), and
      (v) having a lateral separation equal to, or less than, said lateral separation standard (Condition 5); and
   (c) establishing for each aircraft pair which meets all of Conditions 1 through 5 a current conflict alert status.

2. The process as claimed in claim 1 wherein each said aircraft pair is checked for meeting said Conditions 1 through 5 in sequence and including the step of eliminating from further present consideration all aircraft pairs which do not meet any one of said Conditions 1 through 3.

3. The process as claimed in claim 1 including the step on considering for potential conflict alert status all pairs of aircraft which meet said Conditions 1 through 3 but which do not meet both of said Conditions 4 and 5.

4. The process as claimed in claim 3 including the step of determining for each aircraft pair considered for potential conflict alert status whether both of the aircraft are not in a suspended status (Condition 6) and for eliminating from further present consideration all aircraft pairs not meeting said Condition 6 because both aircraft in each pair are in a suspended status.

5. The process as claimed in claim 3 including the step of determining for each aircraft pair considered for potential conflict alert status which:

(a) does not meet either of said Conditions 4 and 5 (not in current height or lateral intrusion); or (b) does meet Condition 5 but not said Condition 4 (in current lateral, but not height, intrusion), whether the two aircraft are converging in height at a rate equal to, or greater than, a preselected height converging rate (Condition 7) and for eliminating from further present consideration all aircraft pairs not meeting said Condition 7.

6. The process as claimed in claim 5 including the step of determining for each aircraft pair considered for potential conflict alert status which:

(a) meets said Condition 4 but not said Condition 5 (in current height, but not lateral, intrusion); or (b) does not meet either of said Conditions 4 and 5 (in neither height nor lateral intrusion) but meet said Condition 7 (height converging rate), whether the two aircraft are laterally converging at a rate equal to, or greater than, a preselected lateral converging rate (Condition 8) and for eliminating from further present consideration all aircraft pairs not meeting said Condition 8.

7. The process as claimed in claim 6 including the step of determining for each aircraft pair that meets said Condition 8 (lateral converging rate) whether the two aircraft are laterally separated by a distance less than a preselected minimum lateral separation distance (Condition 10) and for eliminating from further present consideration all aircraft pairs not meeting said Condition 10.

8. The process as claimed in claim 7 including the step of determining for each aircraft pair that meets said Condition 10 (minimum lateral separation) whether the lateral separation distance between the two aircraft will penetrate a preselected separation volume computed using a maximum preselected look-ahead time (Condition 11) and for eliminating from further present consideration all aircraft pairs not meeting said Condition 11.

9. The process as claimed in claim 8 including the step of determining for each aircraft pair that meets said Condition 11 (future separation volume penetration) whether the computed time for the two aircraft to violate a preselected lateral maximum separation standard is less than said preselected look-ahead time (Condition 12) and for eliminating from further present consideration all aircraft pairs which do not meet said Condition 12.

10. The process as claimed in claim 9 including the step of determining for each aircraft pair that meets said Condition 12 (time to violate maximum lateral separation standard), and which has also met said Condition 4 but not said Condition 5 (current height but not lateral intrusion), whether the two aircraft pair are converging in height at a rate equal to or greater than a preselected height converging rate (Condition 13), which determines parallel height flight and for establishing all aircraft pairs not meeting Condition 13 as having a potential conflict alert status.

11. The process as claimed in claim 10 including the step of determining for each pair of aircraft which:

(a) meet said Condition 13 (are height parallel); or (b) meet said Condition 12 (time to maximum lateral separation standard) and which also did not meet either of said Conditions 4 and 5 (not in current height or lateral intrusion), whether the two aircraft are diverging in height at a rate equal to, or less than, a preselected height divergence rate (Condition 14) and for eliminating from further present consideration all aircraft pairs not meeting said Condition 14 and which are therefore expected to be out of height intrusion by the time lateral intrusion is reached.

12. The process as claimed in claim 11 including the step of determining for each aircraft pair that meets said Condition 14 (height divergence rate) and which has also met said Condition 4 but not said Condition 5 (in current height, but not lateral, intrusion), whether the two aircraft are computed to be separated in height by a distance equal to, or less than, said height separation standard by a time computed to reach lateral intrusion (Condition 15), for eliminating from further present consideration all aircraft pairs not meeting said Condition 15 and for defining all aircraft pairs meeting said Condition 15 as having a potential conflict alert status.

13. The process as claimed in claim 11 including the step of determining for each aircraft pair that meets said Condition 14 (height divergence rate) and which has also not met either of said Conditions 4 and 5 (in neither current height nor lateral intrusion) whether the two aircraft will enter height intrusion prior to exiting lateral intrusion (Condition 16), for eliminating from further present consideration all aircraft pairs not meeting said Condition 16 and for defining all aircraft pairs meeting said Condition 16 as having a potential conflict alert status.

14. The process as claimed in claim 5 including the step of determining for each aircraft pair that meets said Condition 7 (height convergence) and which has also met said Condition 5 but not said Condition 4 (in current lateral, but not height, intrusion) whether the two aircraft are laterally converging at a rate equal to, or less than, a preselected lateral converging rate (Condition 9) which determines whether the two aircraft are in substantially lateral parallel flight.

15. The process as claimed in claim 14 including the step of determining for each aircraft pair that meets said Condition 9 (in lateral parallel flight) whether the two aircraft are converging in height at a rate that will result in height intrusion within a preselected look-ahead time (Condition 17); for eliminating from further present consideration all aircraft pairs not meeting said Condition 17 and for defining all aircraft pairs meeting Condition 17 as having a potential conflict alert status.

16. The process as claimed in claim 14 including the step of determining for each aircraft pair not meeting said Condition 9 (not in lateral parallel flight), whether the two aircraft will enter height intrusion prior to exiting lateral intrusion (Condition 16); for eliminating from further present consideration all aircraft pairs not meeting said Condition 16 and for establishing all aircraft pairs meeting Condition 16 as having a potential conflict alert status.

17. A process for determining en route conflict alert status for a plurality of airborne aircraft for which the position, altitude and velocity of each is monitored in a substantially continuous manner and for which preestablished height and lateral separation standards exist, the processing comprising the steps of:

(a) pairing the aircraft so as to form at least one aircraft pair;

(b) comparing the height and lateral separation of the two aircraft in each aircraft pair with the height and lateral separation standards and establishing a current conflict alert status for all aircraft pairs which are in both height and lateral intrusion;

(c) determining for each aircraft pair which is in current height, but not lateral, intrusion whether:

(1) the two aircraft are laterally converging at a rate equal to, or greater than, a preselected lateral converging rate (Condition 8), (2) the two aircraft are laterally separated by a distance less than a preselected minimum lateral separation distance (Condition 10), (3) the lateral separation distance between the two aircraft will penetrate a preselected separation volume computed using a preselected look-ahead time (Condition 11), (4) the computed time for the two aircraft to violate a preselected lateral maximum separation standard is less than said preselected look-ahead time (Condition 12), and (5) the two aircraft are converging in height at a rate equal to, or greater than, a preselected height converging rate (Condition 13); and (d) establishing all aircraft pairs meeting Conditions 5, 8, 10, 11 and 12 but not meeting Condition 13 as having potential conflict alert status.

18. The process as claimed in claim 17 including the steps of determining for each aircraft pair that meets said Conditions 8, 10, 11, 12 and 13 whether:

(a) the two aircraft are diverging in height at a rate equal to, or less than, a preselected height divergence rate (Condition 14); and (b) the two aircraft are computed to be separated in height by a distance equal to said height separation standard by time computed to reach lateral intrusion (Condition 15), and of establishing all aircraft pairs meeting both said Conditions 14 and 15 as having a potential conflict alert status.

19. The process as claimed in claim 18 including the steps of:

(a) determining for each aircraft pair which is neither in current height nor lateral intrusion whether:

(1) the two aircraft are converging in height at a rate equal to, or greater than, a preselected height converging rate (Condition 7), and (2) the two aircraft will enter height intrusion prior to exiting lateral intrusion (Condition 16), and (b) establishing all aircraft pairs which are neither in current height nor lateral intrusion and which meet said Conditions 6, 7, 8, 10, 11, 12, 14 and 16 as having a potential conflict alert status.

20. The process as claimed in claim 17 including the steps of:

(a) determining for each aircraft pair whether:

(1) the two aircraft have a height separation equal to, or less than, a preselected gross height separation distance (Condition 1), (2) the two aircraft are converging in height or are diverging in height at a rate equal to, or less than, a preselected small height diverging rate (Condition 2), (3) the two aircraft are converging laterally or are diverging laterally at a rate equal to, or less than, a preselected small lateral diverging rate (Condition 3), (4) the two aircraft have a height separation equal to, or less than, said height separation standard (Condition 4), and (5) the two aircraft have a lateral separation equal to, or less than, said lateral separation standard (Condition 5); and (b) establishing all aircraft pairs meeting Conditions 1 through 5 as having a current conflict alert status by being currently in both height and lateral intrusion.

21. The process as claimed in claim 17 including the step of determining for each aircraft pair which is in current height, but not lateral, intrusion whether both aircraft are not in suspension (Condition 6) and for eliminating from further present consideration all aircraft pair that do not meet said Condition 6.

22. A process for determining en route conflict alert status for a plurality of aircraft for which the position, altitude and velocity of each is monitored in a substantially continuous manner and for which preestablished height and lateral separation standards exist, the processing comprising the steps of:

(a) pairing the aircraft so as to form at least one aircraft pair;

(b) comparing the height and lateral separation of the two aircraft in each said aircraft pair with the height and lateral separation standards and establishing a current conflict alert status for those aircraft pairs which are in both height and lateral intrusion;

(c) determining for each said aircraft pair which is in current lateral, but not height intrusion whether:

(1) the two aircraft are converging in height at a rate equal to, or greater than, a preselected height converging rate (Condition 7), (2) the two aircraft are laterally converging at a rate equal to, or less than, a preselected lateral converging rate (Condition 9), (3) the two aircraft will enter height intrusion prior to exiting lateral intrusion (Condition 16); and (d) establishing all aircraft pairs in current lateral but not height intrusion and which meet said Conditions 7, 9 and 16 as having potential conflict alert status.

23. The process as claimed in claim 22 including the steps of:

(a) determining for each aircraft pair which is in current lateral, but not height, intrusion whether the two aircraft are converging in height at a rate that will result in height intrusion within a preselected look-ahead time (Condition 17); and (b) establishing all aircraft pairs in current lateral but not height intrusion and which meet said Conditions 7, 9 and 17 as having a potential conflict alert status.

24. The process as claimed in claim 22 including the step of determining for each aircraft pair which is in current lateral, but not height, intrusion whether both of the aircraft are not in suspension (Condition 6) and for eliminating from further present consideration all aircraft pairs that do not meet said Condition 6.

* * * * *